(12) United States Patent
Besnier et al.

(10) Patent No.: US 12,291,890 B2
(45) Date of Patent: May 6, 2025

(54) DEVICES, SYSTEMS, AND METHODS FOR COMMUNICATION WITH EQUIPMENT SUCH AS AUTOMATIC SWIMMING POOL CLEANERS

(71) Applicant: ZODIAC POOL CARE EUROPE, Belberaud (FR)

(72) Inventors: Arnaud Besnier, Montrabe (FR); Mehdi Chafik, Tournefeuille (FR); Arnaud Lancry, Le Vernet d'Ariege (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 478 days.

(21) Appl. No.: 17/395,584

(22) Filed: Aug. 6, 2021

(65) Prior Publication Data
US 2022/0042335 A1 Feb. 10, 2022

Related U.S. Application Data

(60) Provisional application No. 63/061,898, filed on Aug. 6, 2020.

(51) Int. Cl.
*E04H 4/16* (2006.01)
*C02F 1/00* (2023.01)
(Continued)

(52) U.S. Cl.
CPC .......... *E04H 4/1654* (2013.01); *C02F 1/001* (2013.01); *C02F 1/008* (2013.01); *G05D 1/0016* (2013.01);
(Continued)

(58) Field of Classification Search
CPC ........ E04H 4/1654; C02F 1/001; C02F 1/008; C02F 2103/42; C02F 2209/008;
(Continued)

(56) References Cited

U.S. PATENT DOCUMENTS

| | | | |
|---|---|---|---|
| 9,250,626 | B2 | 2/2016 | Michelon |
| 2005/0077190 | A1* | 4/2005 | Djordjevic ............ C02F 1/4674 205/705 |

(Continued)

FOREIGN PATENT DOCUMENTS

| | | |
|---|---|---|
| EP | 3282072 | 2/2018 |
| EP | 3521532 | 8/2019 |

(Continued)

OTHER PUBLICATIONS

International Application No. PCT/IB2021/057272, International Preliminary Report on Patentability mailed on Feb. 16, 2023, 12 pages.

(Continued)

*Primary Examiner* — Jason Holloway
*Assistant Examiner* — Elizabeth Rose Neleski
(74) *Attorney, Agent, or Firm* — Kilpatrick Townsend & Stockton LLP

(57) ABSTRACT

Devices, systems, and methods may be used for wirelessly communicating underwater (or through air) with equipment such as, but not necessarily limited to, automatic swimming pool cleaners (APCs). Such communication avoids any need for conventional wired communication with the APCs. At least some of the devices may be hand-held and capable of having at least portions immersed in water in normal use. The devices preferably do not use radio frequency (RF) signal to communication with APCs, instead employing light-based or other signal types.

40 Claims, 9 Drawing Sheets

(51) Int. Cl.
  *C02F 103/42* (2006.01)
  *G05D 1/00* (2024.01)
  *H04B 10/80* (2013.01)
(52) U.S. Cl.
  CPC .......... *H04B 10/80* (2013.01); *C02F 2103/42* (2013.01); *C02F 2209/008* (2013.01)
(58) Field of Classification Search
  CPC ......... G05D 1/0016; G05D 2201/0203; H04B 10/80; G08C 17/02; G08C 23/04
  See application file for complete search history.

(56) References Cited

U.S. PATENT DOCUMENTS

| | | | | |
|---|---|---|---|---|
| 2013/0104321 A1* | 5/2013 | Michelon | .............. | E04H 4/1654 15/1.7 |
| 2013/0110319 A1* | 5/2013 | Michelon | .............. | E04H 4/1654 701/2 |
| 2018/0371778 A1* | 12/2018 | Walsh | .................. | H02K 7/1823 |
| 2019/0338546 A1 | 11/2019 | Witelson et al. | | |
| 2020/0063454 A1 | 2/2020 | Attar et al. | | |

FOREIGN PATENT DOCUMENTS

| | | |
|---|---|---|
| WO | 2014168918 | 10/2014 |
| WO | 2017046808 | 3/2017 |

OTHER PUBLICATIONS

International Application No. PCT/IB2021/057272, International Search Report and Written Opinion mailed on Jan. 14, 2022, 18 pages.

International Application No. PCT/IB2021/057272, Invitation to Pay Additional Fees and, Where Applicable, Protest Fee mailed on Nov. 8, 2021, 11 pages.

* cited by examiner

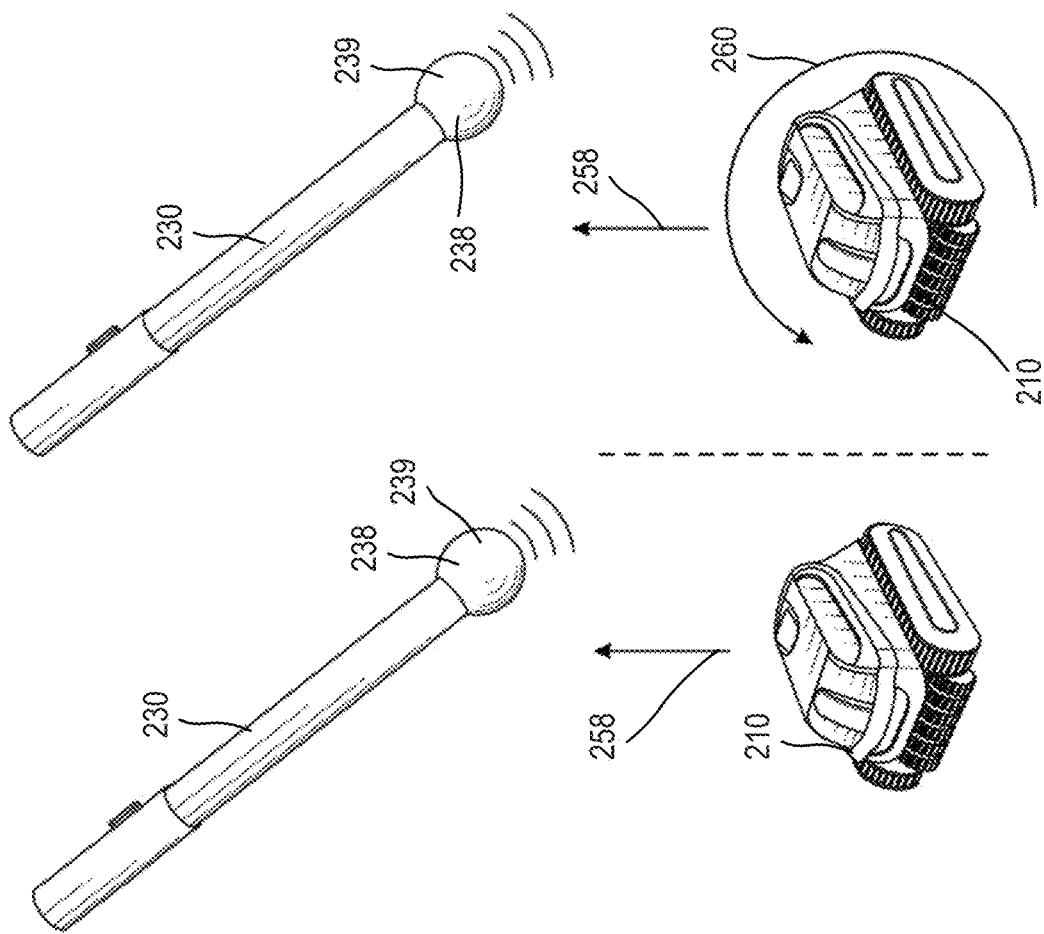
FIG. 6B
FIG. 6A
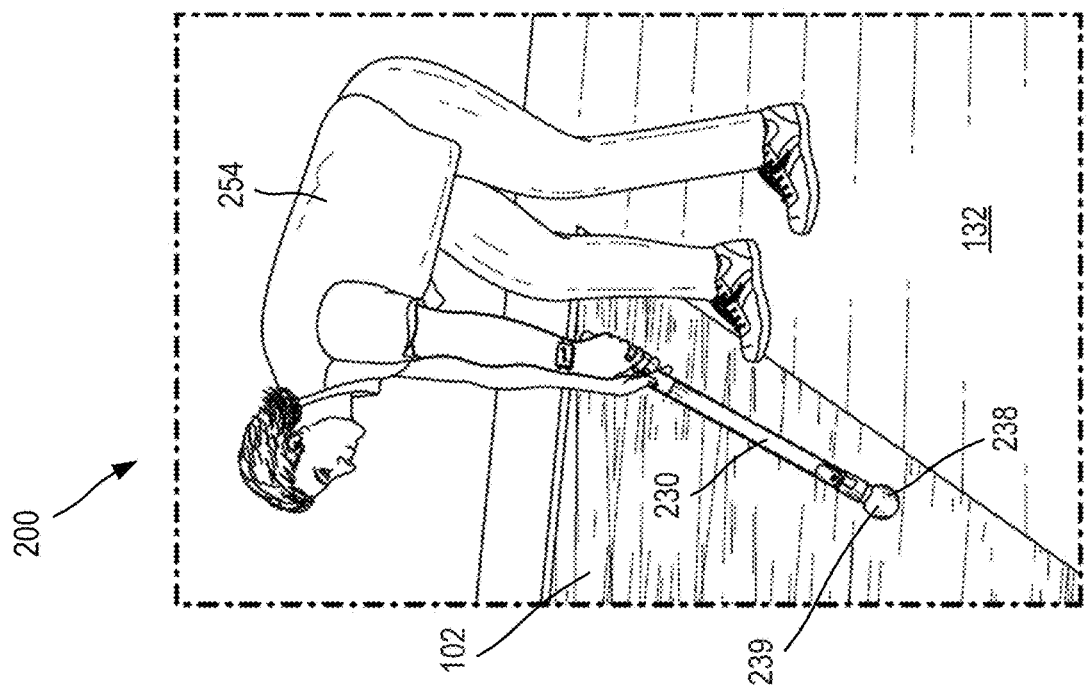
FIG. 5

DEVICES, SYSTEMS, AND METHODS FOR COMMUNICATION WITH EQUIPMENT SUCH AS AUTOMATIC SWIMMING POOL CLEANERS

REFERENCE TO RELATED APPLICATION

This application claims the benefit of U.S. Provisional Patent Application No. 63/061,898, filed on Aug. 6, 2020 and entitled DEVICES, SYSTEMS, AND METHODS FOR UNDERWATER COMMUNICATION WITH EQUIPMENT SUCH AS AUTOMATIC SWIMMING POOL CLEANERS, the content of which is hereby incorporated by reference in its entirety.

FIELD OF THE INVENTION

This invention relates to communicating with equipment operating underwater or outside the water and more particularly, although not necessarily exclusively, to concepts and methods for communicating with autonomous vehicles such as automatic pool cleaners ("APCs") configured to operate in swimming pools or spas.

BACKGROUND

Commonly-owned U.S. Pat. No. 9,250,626 to Michelon describes an exemplary apparatus (often called a "robot" or a "robotic APC") for cleaning a swimming pool. The apparatus includes wheels or other motive elements and is configured to travel autonomously within the pool. It further may be connected via cable to an "intermediate relay," or control box, positioned near the pool. The external control box may receive signals from a wireless transmitter of a remote control device and forward control information to the cleaning apparatus through the cable. In particular, because of known difficulties in transmitting wireless radio frequency (RF) signals substantial distances through water, the control box is not positioned within the pool, nor does the wireless transmitter of the remote control device communicate directly with the underwater APC. The control box thus indeed functions as an "intermediate relay," in that it receives control information wirelessly externally of the pool and relays it via wire to the submerged cleaner within the pool.

U.S. Patent Application Publication No. 2020/0063454 of Attar, et al. discusses another robotic APC to which a control cable is connected. Consistent with conventional devices, the cleaner of the Attar application receives signals via wire from an external source. As noted in the Attar application, the cable is subject to being pulled for various reasons; although such pulling is disadvantageous in some cases, the cleaner of the Attar application describes using sensed directional pulling information to control certain movements of the cleaner.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a hand-held device includes a communication region configured to operate while immersed in water.

According to some embodiments, a method of communicating with equipment operating in water of a swimming pool includes immersing at least part of the communication device in the water and causing the communication device to emit a signal through the water to the equipment. In certain embodiments, the emitted signal is light based. In some embodiments, the method includes causing the communication device to receive a return signal from the equipment through the water.

According to various embodiments, a system for cleaning a swimming pool includes (a) an automatic swimming pool cleaner configured to operate in water within the swimming pool and (b) a hand-held device comprising a communication region configured to operate while immersed in the water.

According to some embodiments, a control device for a pool system includes a housing and a communication region on the housing configured to operate while immersed in water. The control device may wirelessly communicate using the communication region with at least one piece of equipment of the pool system, and the control device may be a hand-held device.

According to certain embodiments, a method of communicating with equipment operating in water of a pool includes immersing at least a communication region of a control device in the water, and causing the control device to emit a wireless signal through the water to the equipment.

According to various embodiments, a cleaning system for a swimming pool includes an automatic swimming pool cleaner that may operate in water within the swimming pool, and a control device having a housing. The housing includes a communication region, and the control device may operate and wirelessly communicate with the automatic swimming pool cleaner while at least the communication region of the housing is immersed in the water. In certain aspects, the control device is a hand-held device.

According to certain embodiments, an automatic swimming pool cleaner includes a housing, a communication module, and a controller, and the automatic swimming pool cleaner may be at least partially submerged within water of a swimming pool or spa. The communication module may receive a light signal while the automatic swimming pool is at least partially submerged. The controller may receive an electrical signal from the communication module, the electrical signal including at least one characteristic of the light signal, determine a control response for the automatic swimming pool cleaner based on the at least one characteristic, and control the automatic swimming pool cleaner pursuant to the determined control response.

According to some embodiments, a method of controlling an automatic swimming pool cleaner within a pool includes receiving a light signal using a communication module on the automatic swimming pool cleaner, where the light signal includes at least one characteristic. The method includes determining a control response using a controller on the automatic swimming pool cleaner based on the received light signal and the at least one charadteristic, and controlling the automatic swimming pool cleaner pursuant to the determined control response.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

FIG. 5 illustrates the pool system of FIG. 2 being used by a user.

FIGS. 6A-B illustrate examples of control actions responsive to a signal from the control system of FIG. 2.

DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels used for recreation or therapy.

Described herein are systems and methods for communicating with equipment, such as an APC, without requiring any wired communication. In certain aspects, the systems and methods described herein may provide wireless communication when the APC or other equipment is submerged in a pool or other body of water as well as when it is not submerged. In various embodiments, the systems and devices provided herein may be both hand-held and capable of having at least portions immersed in water in normal use. In some embodiments, devices consistent with the present invention conceivably may wirelessly transmit and receive radio waves, such as radio frequency (RF) signals. In various embodiments, the systems and devices provided herein may utilize wireless technologies other than radio waves. In certain embodiments, light-based signals, including but not limited to light fidelity (LiFi) signals, may be utilized by the systems and devices provided herein. Additionally or alternatively, sound signals, including but not limited to sound navigation and ranging (SONAR) or other types of signals, may be utilized by the systems and devices described herein. In other embodiments, other types of wireless communications and/or combinations of types of wireless communications may be utilized. Although the systems and methods are described for use in connection with water containing vessels, persons skilled in the relevant field will recognize that the present invention may be employed in other manners.

Figure 1:
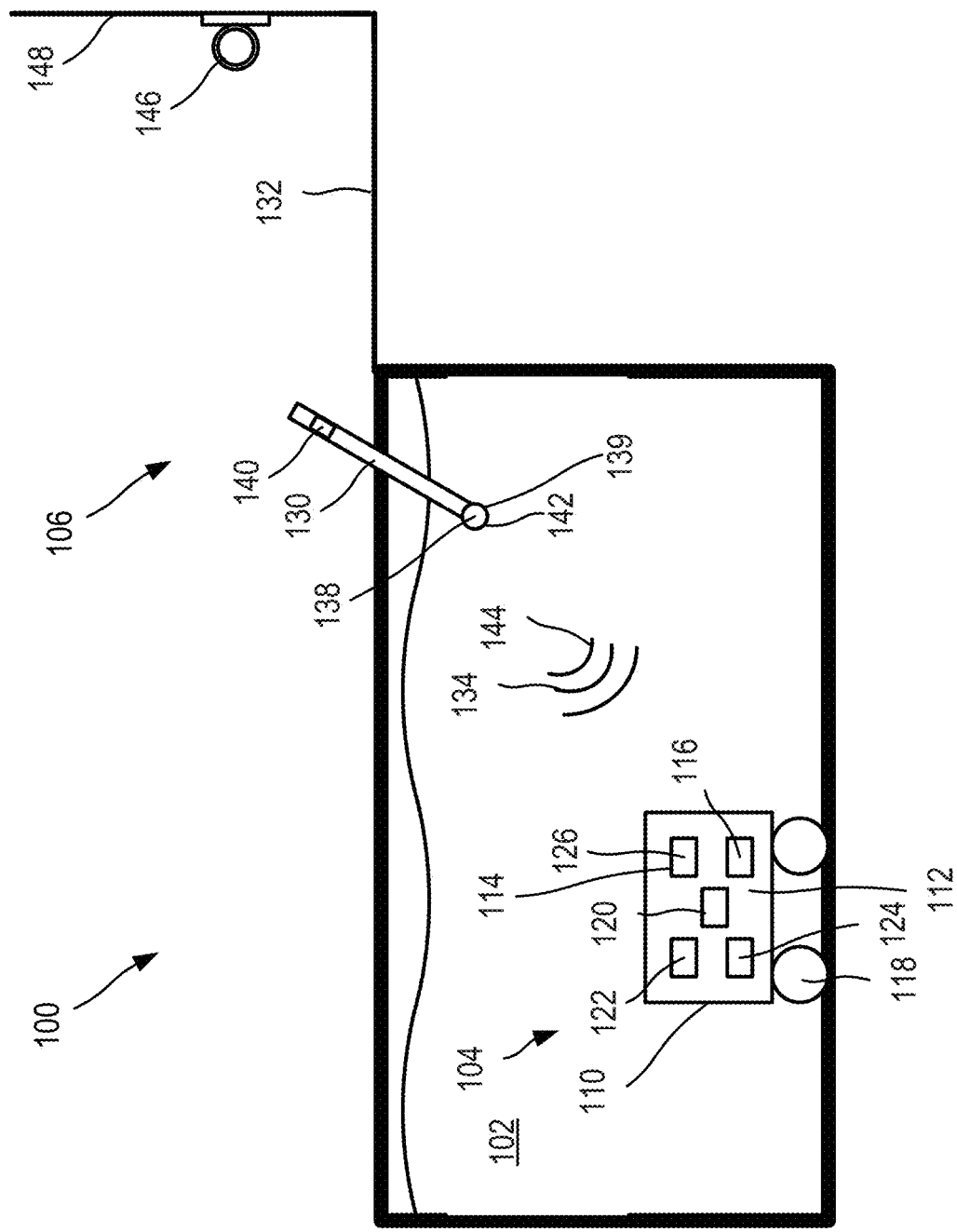
FIG. 1 illustrates a pool system with a control system according to embodiments of the disclosure.

FIG. 1 illustrates an example of a pool system 100 according to various embodiments. The pool system 100 may be a pool, spa, etc. that includes a body of water 102. In various embodiments, the pool system 100 includes at least one piece of equipment 104 and a control system 106 for selectively controlling the at least one piece of equipment 104. Optionally, a deck 132 or other suitable surface or structure may at least partially surround the body of water 102.

The at least one piece of equipment 104 may be various suitable pieces of equipment that perform various tasks in and/or around the body of water 102. In certain embodiments, the piece of equipment 104 may be submerged within the body of water 102. In other embodiments, the piece of equipment 104 may be outside of the body of water 102 (e.g., exposed to air). In the embodiment of FIG. 1, the piece of equipment 104 is a battery-powered, robotic APC 110 that may be submerged within the water 102. The APC 110 includes a housing 112, a communication module 114, and a controller 116 communicatively coupled to the communication module 114. The communication module 114 may be various suitable devices or combinations of devices for receiving wireless signals from the control system 106 and optionally transmitting wireless signals to the control system 106. The communication module 114 may be within the housing 112 and/or as otherwise desired. In certain embodiments, the communication module 114 may include a light sensor for receiving light signals from the control system 106, a receiver for receiving SONAR or other sound signals from the control system 106, a receiver for receiving radio waves (e.g., RF signals), combinations thereof, or other suitable wireless communication modules as desired. In the embodiment of FIG. 1, the communication module 114 is a light transceiver 126. The communication module 114 may receive the wireless signals from the control system 106, convert them, in conventional manner, into electrical signals, and transmit them to the controller 116. The controller 116 may generate a control response based on the received signals as discussed in detail below. Optionally, the controller 116 may transmit a wireless signal to the control system 106 using the communication module 114. As a non-limiting example, the controller 116 may transmit a confirmation signal to the control system 106 responsive to receiving an initial wireless signal from the control system 106. In the example of FIG. 1, the controller may transmit a light signal using the light transceiver 126 of the communication module 114, although other wireless communication techniques may be utilized as desired.

In addition to the communication module 114 and the controller 116, the APC 110 may include other optional features as desired. Optionally, the APC may include one or more motive elements 118 for moving the APC 110 autonomously within the body of water 102. Suitable motive elements 118 include, but are not limited to, wheels, tracks, rollers, feet, combinations thereof, and/or other suitable devices or mechanisms as desired. Additionally or alternatively, the APC 110 may also include one or more of an electric motor 120, a pump 122, and a debris filter 124. In some embodiments, a charging base and/or a storage base optionally may be provided with the APC 110. In certain embodiments, the components of the APC 110 optionally may be communicatively coupled to the controller 116 and/or selectively controlled by the controller 116. The particular features illustrated with the APC 110 should not be considered limiting, and in other embodiments, the APC 110 may include fewer and/or additional features as desired. As two non-limiting examples, in other embodiments, the APC 110 may be similar to that described in U.S. Pat. No. 9,250,626 to Michelon or in U.S. Patent Application Publication No. 2020/0063454 of Attar, et al., both of which are hereby incorporated by reference in their entireties. In other embodiments, the piece of equipment 104 may be other pieces of equipment for a pool as desired.

In various embodiments, and as illustrated in FIGS. 1-4, for example, the control system 106 includes a control device 130 for generating a wireless signal 134 that is receivable by the APC 110 (via the communication module 114) for controlling the APC 110. In certain embodiments, the control device 130 includes an elongated housing 136 that may be suitable for grasping by a user. In some embodiments, the control device 130 includes a communications module 138 (e.g., a wireless transceiver) for wireless communications and a power supply 140. In certain embodiments, the communications module 138 is provided within a head portion 139 of the housing 136, although it need not be in other embodiments. In the embodiment of FIG. 1, the communications module 138 is a light transceiver 142, and the wireless signal 134 is a light signal 144. In certain embodiments, the communications module 138 and the power supply 140 may be provided within the housing 136. In various aspects, the control device 130 may be "autonomous" by virtue of the communications module 138 and the power supply 140. In various embodiments, the control device 130 may include additional features or combinations of features as desired, including but not limited to a controller, one or more sensors, one or more buttons or switches, a control strap or leash, combinations thereof, and/or other features as desired. As some non-limiting examples, the control device 130 may include command switches and buttons, sensors (including but not limited to water detection sensors, accelerometers, gyroscopes, compasses, GPS, temperature sensors, and/or pressure sensors), easy-to-find functions, WiFi switches or transceivers, Bluetooth switches or transceivers, combinations thereof, and/or other features as desired. During use, and as discussed in detail below, at least the communications module 138 may be submerged for transmitting the wireless signal 134 to the APC 110.

In some embodiments, the control system 106 optionally includes a support base 146. When included, the support base 146 may be provided at various locations as desired. In the embodiment of FIG. 1, the support base 146 is provided on a wall 148. The control device 130 may be mounted or otherwise supported on the support base 146 for storage or safekeeping when not in use. The particular support base 146 illustrated should not be considered limiting on the disclosure. In other embodiments, the support base 146 may be omitted. The particular shape, size, and structure of the control device 130 and/or the support base 146 should not be considered limiting.

The control device 130 may be used to establish communication between the APC 110 and the control device 130. Once communication is established between the APC 110 and the control device 130, any type of information or data may be exchanged by the light-based (or other) signals as desired. As a non-limiting example, the robotic APC 110 within the body of water 102 may be signaled using the control device 130 when a homeowner or other pool user desires to remove the APC 110 from the body of water 102. In these embodiments, the user may partially or fully submerge the control device 130 within the water 102 and cause the control device 130 to transmit one or more wireless signals 134. The signals 134 may instruct the APC 110 to begin movement until it reaches any wall of the pool and then climb the wall for presentation to the user at the waterline of the pool, which in this application may be called "easy lift." Alternatively, the signals 134 may instruct the APC 110 to turn toward the user and move within the pool until it reaches the wall closest to the user, following which it climbs the wall for presentation at the waterline (called "orientable easy lift"). In the former circumstance, the user must walk along the pool deck 132 to retrieve the APC 110 at the waterline, whereas in the latter circumstance, the APC 110 presents itself for retrieval in the immediate vicinity of the user.

The control device 130 may be used to establish communication between the APC 110 and the control device 130 when the APC 110 (or other piece of equipment 104) is outside the body of water 102. Once communication is established between the APC 110 and the control device 130, any type of information or data may be exchanged by the light-based (or other) signals through the air. As a non-limiting example, the robotic APC 110 outside the body of water 102 may be signaled using the control device 130 when a homeowner or other pool user desires to locate the APC 110, instruct the APC 110 to move to a charging base or enter the body of water 102, or cause other desired operation of the APC 110. In these embodiments, the control device 130 need not be submerged within the body of water 102 to cause the control device 130 to transmit one or more wireless signals 134 to the APC 110.

FIGS. 2-8B illustrate another example of a pool system 200 according to various embodiments. The pool system 200 is substantially similar to the pool system 100 and includes the body of water 102, the piece of equipment 104, and the control system 106. Compared to the pool system 100, the piece of equipment 104 of the pool system 200 is another type of APC 210.

Figure 3:
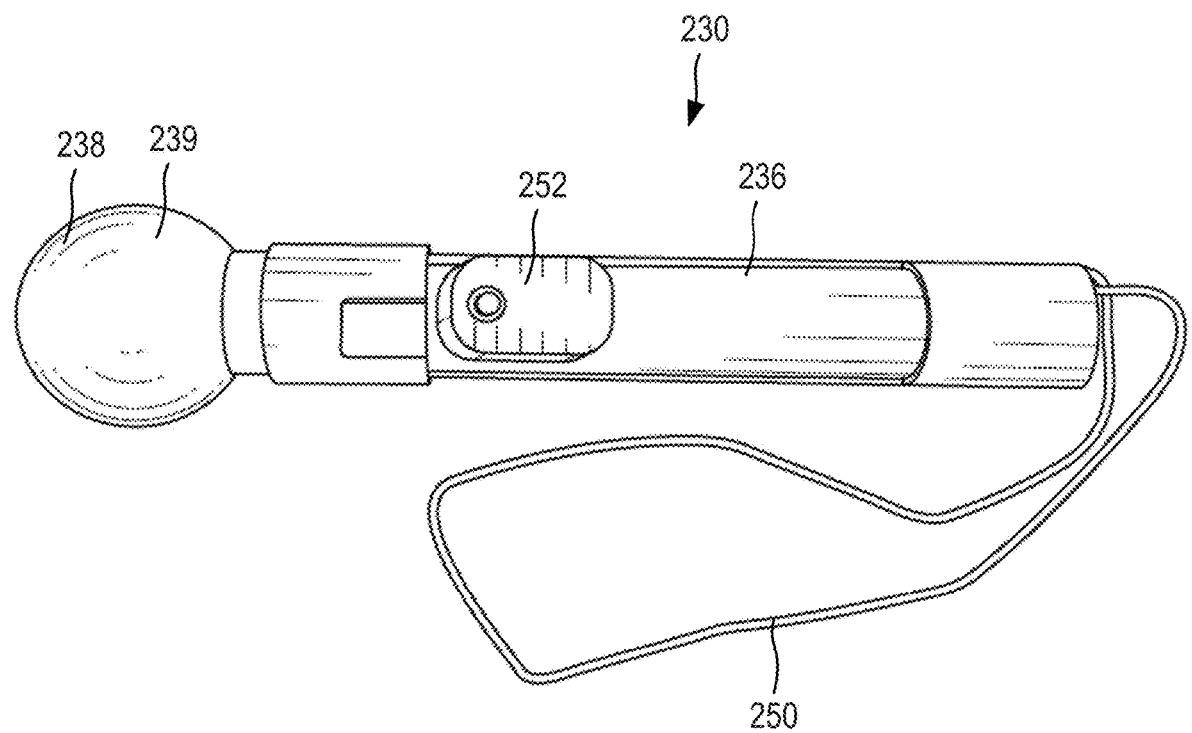
FIG. 3 illustrates a control device of the control system of FIG. 2.
Figure 4:
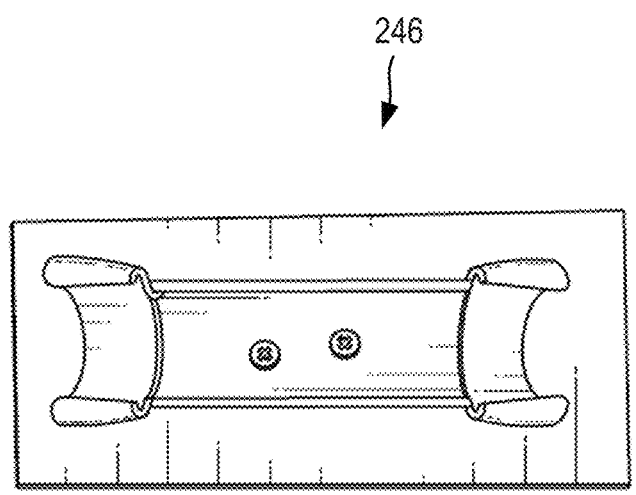
FIG. 4 illustrates a support base for the control device of FIG. 3.

Similar to the pool system 100, the control system 106 of the pool system 200 includes a control device 230 and a support base 246. As best illustrated in FIG. 3, the control device 230 is substantially similar to the control device 130 and includes an elongated housing 236 with a shape different from that of the housing 136, a communication module 238 provided in a head portion 239 of the housing 236, and a power supply (not visible in the figures). Similar to the communications module 138, the communications module 238 includes a light-based (or other) transmitter and receiver for communicating with the APC 210.

In various embodiments, and as best illustrated in FIGS. 8A-B, the control device 230 may be buoyant in water. In these examples, the control device 230 may not normally sink if inadvertently dropped in the water 102, such as by a user 254. Compared to the control device 130, the control device 230 also includes a control strap or leash 250, which may be connected to the housing 236 to facilitate a user's control of the control device 230. In certain embodiments, and as best illustrated in FIGS. 8A-B, the leash 250 may facilitate retrieval of the control device 230 using a stick or other object 266. Additionally or alternative, the leash 250 may function to receive an arm or hand of the user 254 to reduce risk of the user 254 dropping the control device 230 into the water 102. In addition, and as illustrated in FIG. 3, the control device 230 includes a control switch or button 252 that a user may selectively engage to cause the control device 230 to transmit one or more wireless signals. The support base 246 of the pool system 200 has a different shape compared to the support base 146 of the pool system 100, but like the support base 146, the support base 246 may be used to store or otherwise support the control device 230 as desired.

Figure 2:
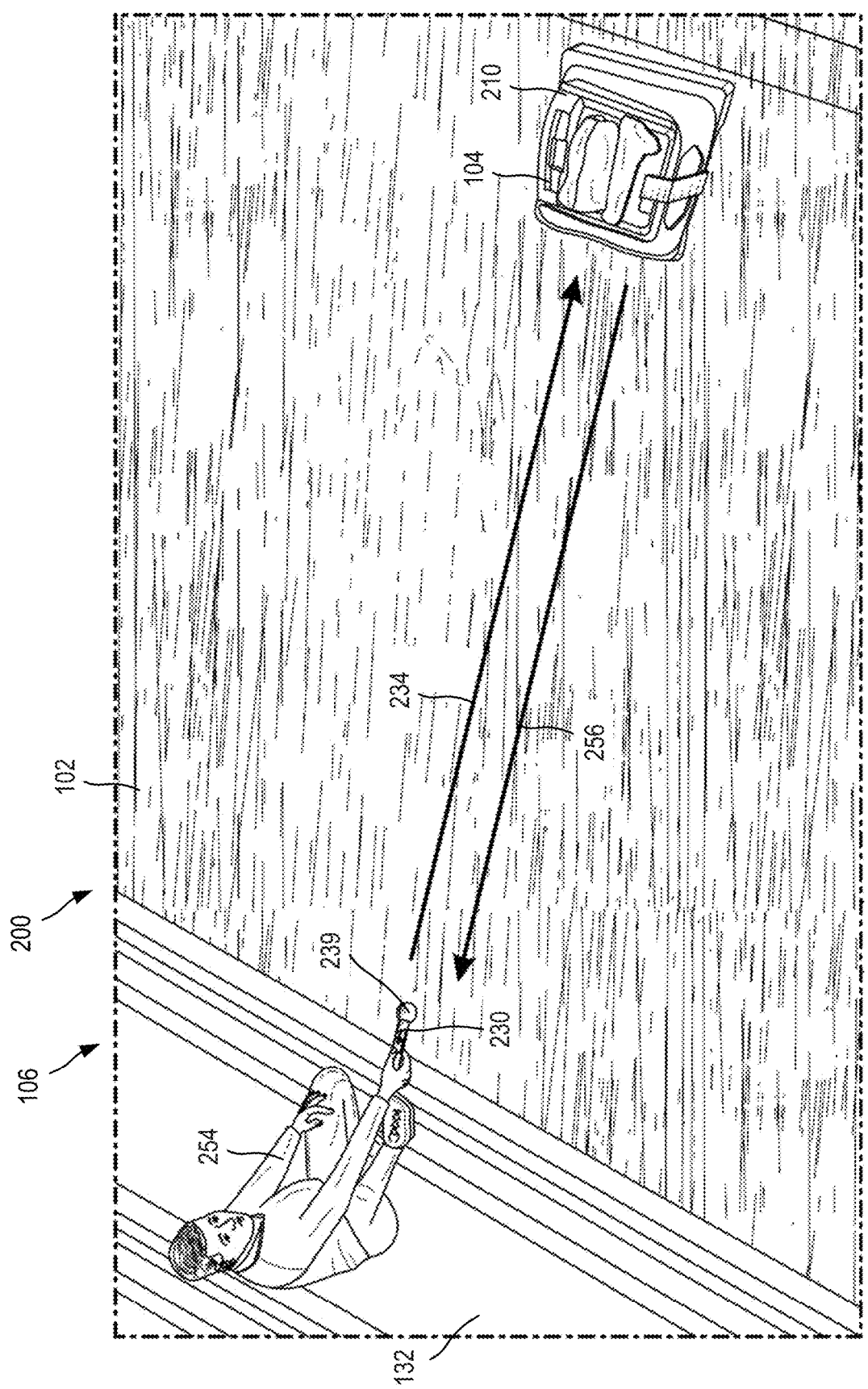
FIG. 2 is another illustration of a pool system with a control system according to embodiments of the disclosure.

As illustrated in FIG. 2, the user 254 may optionally use the control device 230 to communicate with the APC 210 operating within the body of water 102 (or outside the body of water 102). The user 254 advantageously need not enter the body of water 102, but rather may communicate with the APC 210 while positioned on the deck 132 of the pool system 200. As illustrated in FIG. 2, the user 254 is holding the control device 230 with the head portion 239 of the housing 236 (having the communication module 238) underwater. The remainder of housing 236 need not necessarily be underwater, but it may be positioned underwater in other embodiments. In various embodiments, positioning at least the head portion 239 underwater (and/or the portion of the housing 236 including the communication module 238) optionally makes the wireless signal understandable by the APC 210. Stated differently, in some optional embodiments, the communication module 238 must be positioned underwater in order to make the wireless signal understandable by the APC 210. In other embodiments, the control device 230 may transmit the wireless signal without requiring the head portion 239 and/or communication module 238 be underwater, particularly if the APC 210 is outside the body of water 102 and the wireless signal will be transmitted through the air.

FIGS. 6A-B illustrate the control device 230 sending a wireless signal 134 (e.g., a light-based signal) to the APC 210 with two sample types of instructions. FIG. 6A illustrates a "short press" instruction being sent to the APC 210, in which the user 254 may briefly engage the button 252 to produce the "easy lift" result described above (represented by arrow 258). FIG. 6B illustrates a "long press" instruction being sent to the APC 210, in which the user 254 may engage the button 252 for a longer duration than the "short press" (and optionally for a predefined duration) to produce the above-discussed "orientable easy lift" result (represented by arrows 258 and 260). Other instructions may be sent to APC 210 in any suitable manner, however, and "long" and "short" presses are not limited to producing any particular types of instructions. For example, patterns of presses of various durations may be used to transmit various other signals to the APC 210. In this way, the control device 230 may be controlled such that at least one characteristic of the signal is controlled or adjusted as desired, and control or adjustment of the at least one characteristics (e.g., duration, pattern, frequency, etc.) of the signal may cause the controller of the APC 210 to perform certain control actions.

Referring back to FIG. 2, another non-limiting example of control of the APC 210 using the control device 230 is illustrated. In FIG. 2, the APC 210 is positioned within the body of water 102 and remote from any wall of the pool, and the user 254 would like to retrieve the APC 210 and remove it from the water 201. As shown, the user 254 is kneeling on the deck 132 of the pool system 200 (or otherwise suitable positioned) and holding the control device 230 such that the head portion 239 is at least partially submerged in the water 102. The user 254 may cause the control device 230 to send one or more wireless signals 234 to the APC 210. As a non-limiting example, the user 354 may engage the button 252 such that the control device 230 sends a wireless signal 234 to the APC 210 instructing the APC 210 to present itself for retrieval. The APC 210 may receive the signal 234, and based on a characteristic of the received signal, generate a control action or response. As a non-limiting example, the controller of the APC 210 may receive the signal 234, and based on the duration, control the APC 210 to perform its "easy lift" or "orientable easy lift" actions. Optionally, the APC 210 may transmit one or more wireless signals 256 back to the control device 230 if appropriate. Other control responses may include, but are not limited to, one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Figure 7:
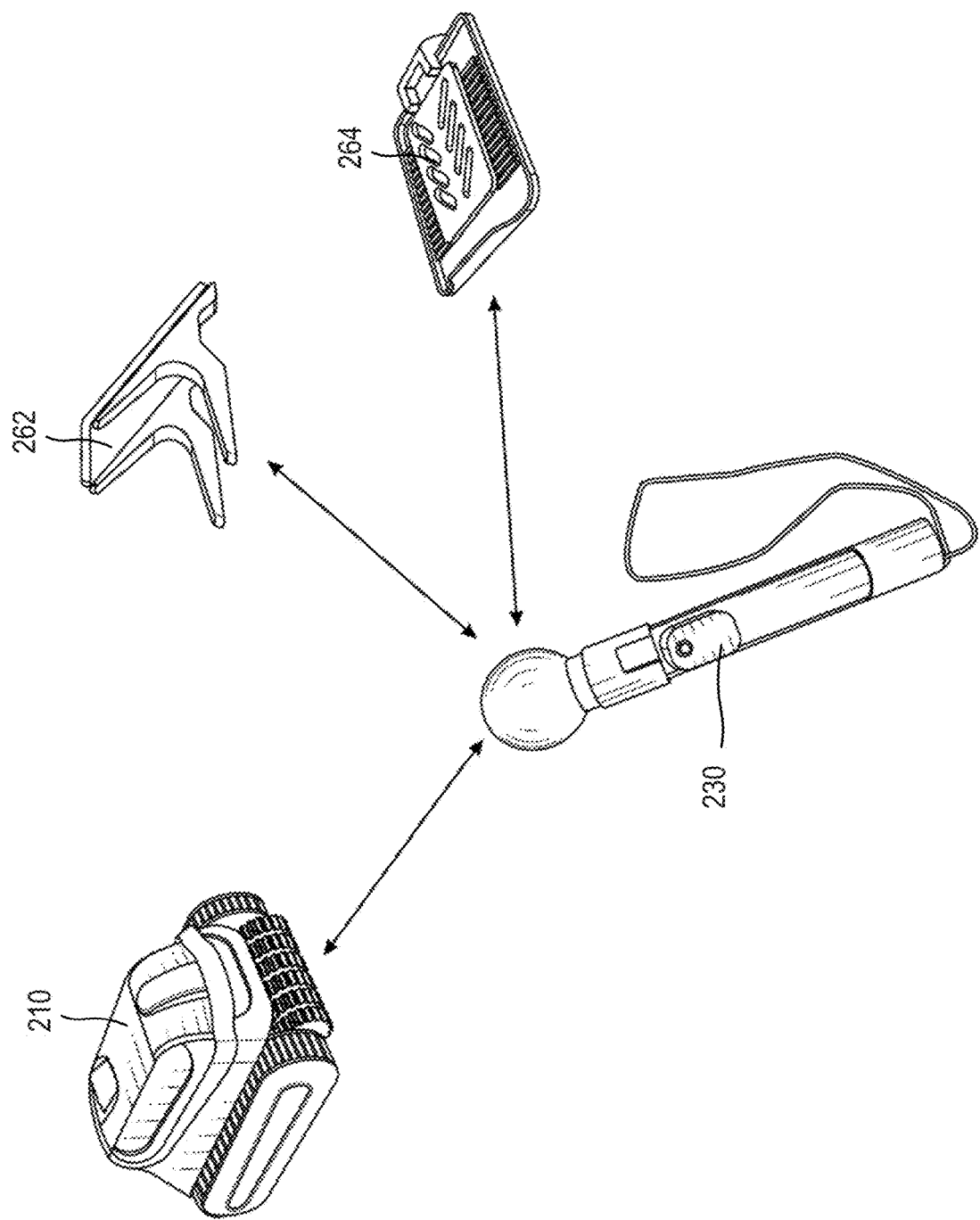
FIG. 7 illustrates communications using the control system of FIG. 2.
Figure 8:
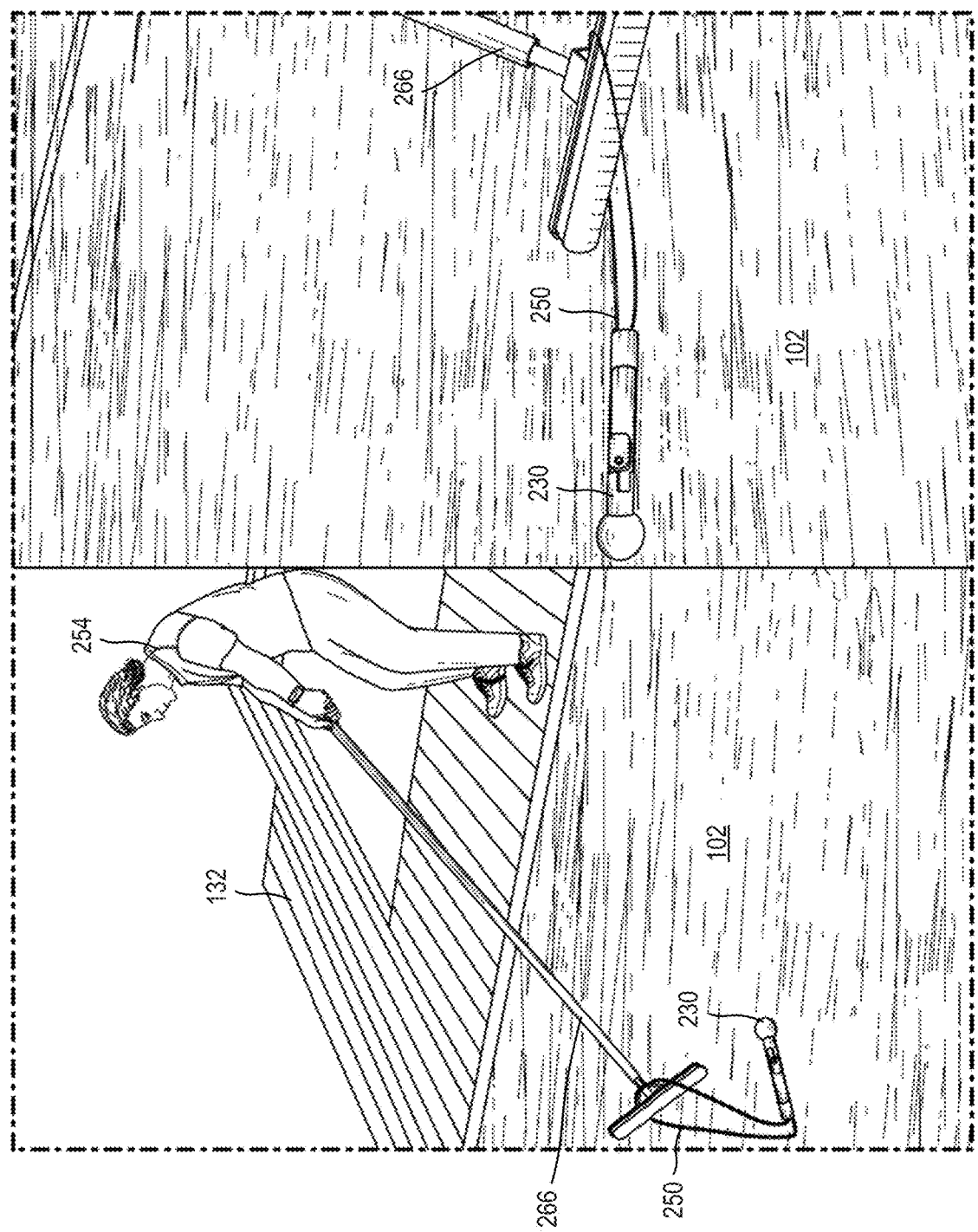
FIGS. 8A-B illustrate the pool system of FIG. 2 being used by a user.
Figure 9:
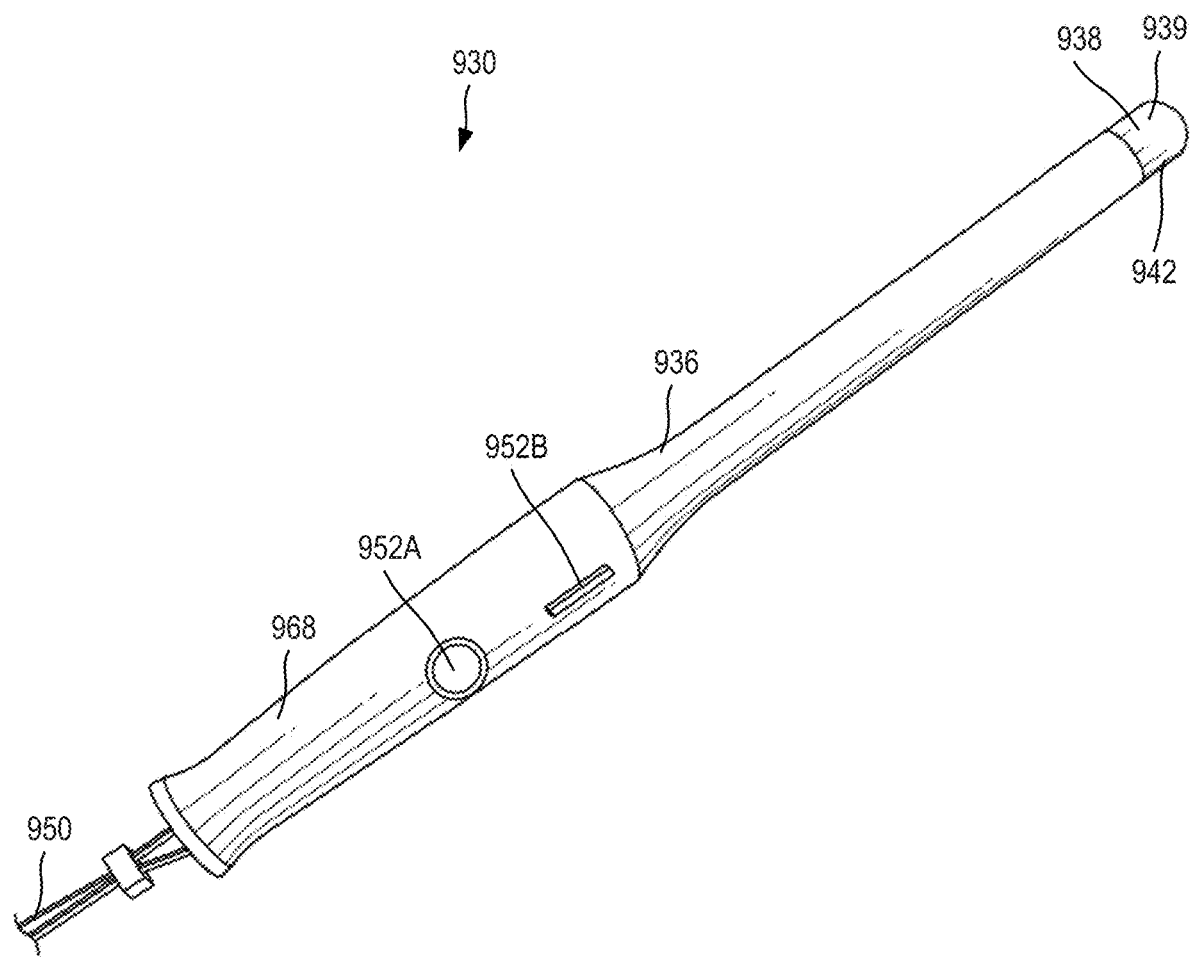
FIG. 9 illustrates a control device for a pool system according to embodiments of the disclosure.
Figure 10:
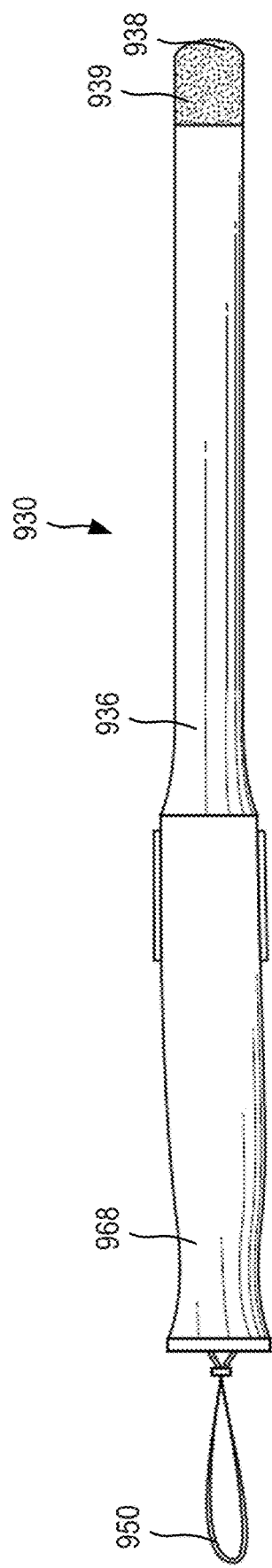
FIG. 10 is a front view of the control device of FIG. 9.
Figure 11:
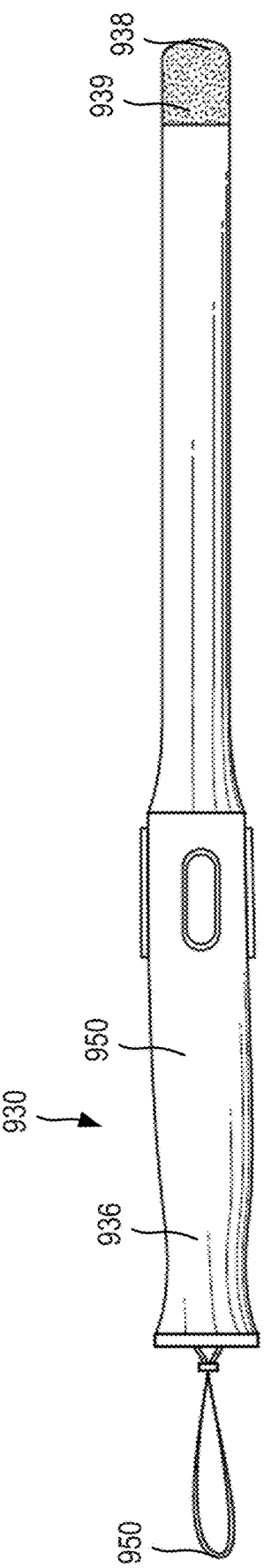
FIG. 11 is a rear view of the control device of FIG. 9.
Figure 12:
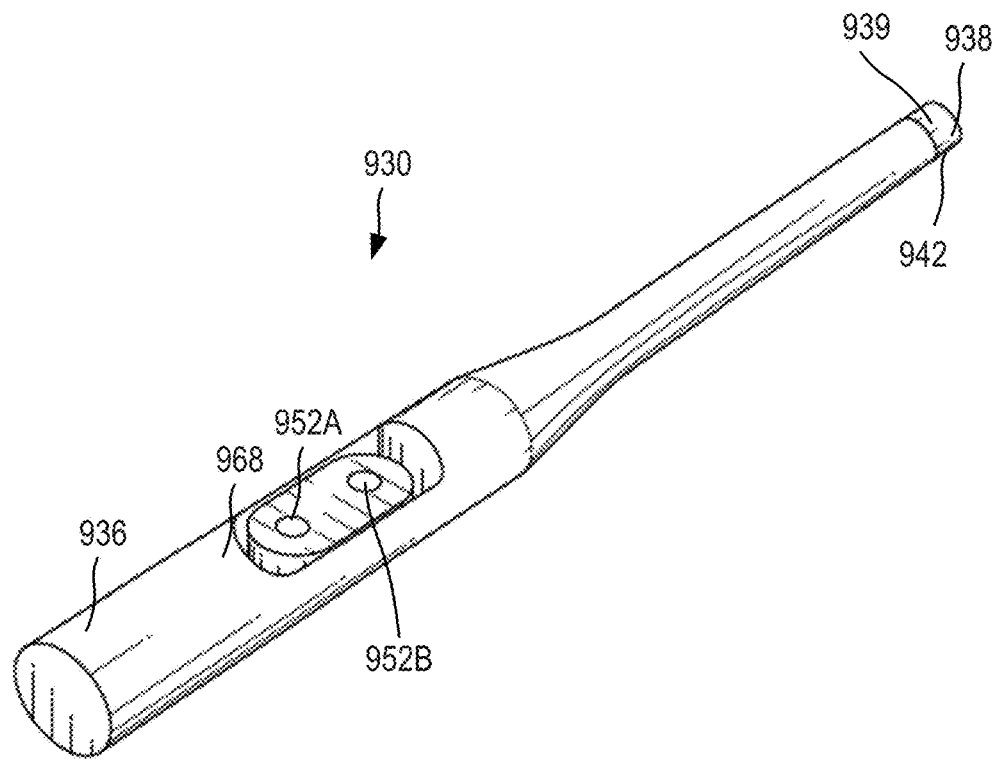
FIG. 12 is a perspective view of the control device of FIG. 9.

As illustrated in FIG. 7, in addition to or in place of the APC 210, the control device 230 may be configured to communicate with other pieces of equipment 104 and/or components of the pool system 200 as desired. FIG. 7 illustrates possible communication between the control device 230 and the APC 210, between the control device 230 and a charging base 262 for the APC 210, and between the control device 230 and a storage base 264 for the APC 210. Additionally or alternatively, the control device 230 may communicate with control boxes such as the intermediate relay of the Michelon patent, with smartphones, tablets, computers, servers, etc., located either locally to or remote from pool, and/or various other devices as desired.

FIGS. 9-13 illustrate another example of a control device 930 for a control system for a pool system according to various embodiments. The control device 930 is substantially similar to the control device 130 and the control device 230 and includes an elongated housing 936 having a head portion 939. In certain embodiments, the housing 936 may be an integral or monolithically formed component formed as a single piece; however, in other embodiments, the housing 936 may include two or more sub-components that are joined together using various suitable techniques to form the housing 936. A communications module 938 is provided within the head portion 939, and similar to the control device 130, the communications module 938 is a light transceiver 942 of LiFi or light communications. In other embodiments, the communications module 938 may be configured for other wireless communications. In a non-limiting example, the communications module 938 may be configured for ultrasonic communications.

A leash 950, which may be similar to the leash 250, is optionally attached to the housing 936. A non-head portion 968 of the control device 930 may be configured to be easy to grasp by a user. Optionally, the control device 930 includes a plurality of switches of buttons 952A-B, although in other embodiments, a single button may be utilized or the buttons may be omitted. In the embodiment illustrated, the button 952A is an "easy lift" actuation button or switch, and the button 952B is a "stick wake up" button or switch that may initially activate the control device 930.

Figure 13:
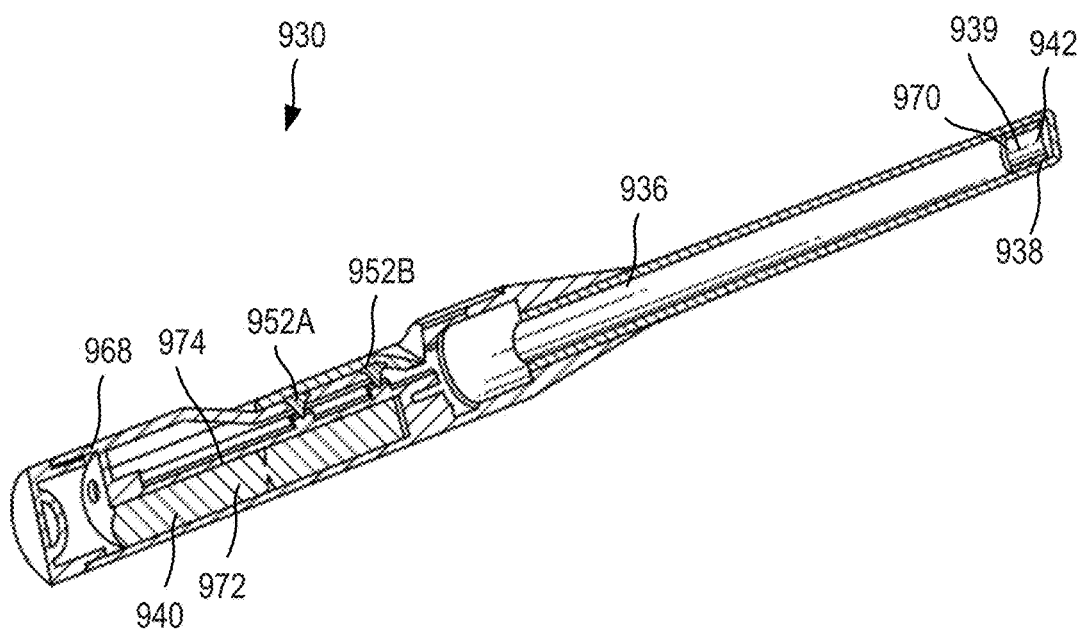
FIG. 13 is a sectional view of the control device of FIG. 9.

Optionally, and as illustrated in FIG. 13, the control device 930 includes a water sensor 970 for sensing that the head portion 939 is in contact with water. In certain aspects, the water sensor 970 may optionally transmit a "wake up" signal and/or the controller of the control device 930 may send a message responsive to the detection of water by the water sensor 970. In other embodiments, additional or alternative sensors may be utilized as desired.

In certain embodiments, and as illustrated in FIG. 13, a power source 940, including but not limited to batteries 972, may be provided within the housing 936. Optionally, a printed circuit board 974, which may or may not include a controller (e.g., any suitable computing device with a processor and/or memory) may optionally be provided within the housing 936. As previously mentioned, various other features or combinations of features may be provided with the control device 930 as desired.

Although the foregoing examples are useful in describing aspects of the invention, persons skilled in the art will recognize that the invention is not limited to use of any particular ones of the disclosed actions. As noted above, the wireless signals may be light-based, sound-based, or as otherwise desired. Further, the characteristic of the wireless signal used to control the piece of equipment need not be a duration and may be other characteristics of the signal as desired, including but not limited to a pattern of light or sound, a light color, a light brightness, a frequency, combinations thereof, or other characteristics or combinations of characteristics as desired. Yet further, the wireless signals may provide other instructions to an APC, such as (but not limited to) stopping movement, changing speed of movement, changing direction of linear or rotational movement, etc. Moreover, the wireless signals used to control the piece of equipment may be transmitted through the air (e.g., if the piece of equipment and/or the control device are outside the body of water).

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A hand-held device comprising a communication region configured to operate while immersed in water.

Illustration 2. A method of communicating with equipment operating in water of a swimming pool, comprising immersing at least part of the communication device in the water and causing the communication device to emit a signal through the water to the equipment.

Illustration 3. A method according to any preceding or subsequent illustrations or combination of illustrations, in which the emitted signal is light based.

Illustration 4. A method according to any preceding or subsequent illustrations or combination of illustrations, further comprising causing the communication device to receive a return signal from the equipment through the water.

Illustration 5. A system for cleaning a swimming pool comprising (a) an automatic swimming pool cleaner configured to operate in water within the swimming pool and (b) a hand-held device comprising a communication region configured to operate while immersed in the water.

Illustration 6. A control device for a pool system, the control device comprising: a housing; and a communication region on the housing configured to operate while immersed in water, wherein the control device is configured to wirelessly communicate using the communication region with at least one piece of equipment of the pool system, and wherein the control device is a hand-held device.

Illustration 7. The control device according to any preceding or subsequent illustrations or combination of illustrations, wherein the housing comprises a head portion and a non-head portion, and wherein the communication region of the housing is the head portion of the housing.

Illustration 8. The control device according to any preceding or subsequent illustrations or combination of illustrations, further comprising a communication module within the housing, wherein the communication module comprises a transceiver.

Illustration 9. The control device according to any preceding or subsequent illustrations or combination of illustrations, wherein the transceiver comprises a light transceiver, and wherein the control device is configured to wirelessly communicate with light-based signals.

Illustration 10. The control device according to any preceding or subsequent illustrations or combination of illustrations, further comprising a power supply within the housing.

Illustration 11. The control device according to any preceding or subsequent illustrations or combination of illustrations, further comprising a button engageable by a user for generating a wireless signal.

Illustration 12. The control device according to any preceding or subsequent illustrations or combination of illustrations, further comprising a controller and a sensor, wherein the sensor is configured to detect a presence of water, and wherein the controller is configured to generate a wireless signal responsive to the detection of water by the sensor.

Illustration 13. A method of communicating with equipment operating in water of a pool, the method comprising: immersing at least a communication region of a control device in the water; and causing the control device to emit a wireless signal through the water to the equipment.

Illustration 14. The method according to any preceding or subsequent illustrations or combination of illustrations, wherein causing the control device to emit a wireless communicate comprises causing the control device to emit a light-based signal.

Illustration 15. The method according to any preceding or subsequent illustrations or combination of illustrations, further comprising causing the control device to receive a return signal from the equipment through the water.

Illustration 16. The method according to any preceding or subsequent illustrations or combination of illustrations, wherein causing the control device to emit the wireless signal comprises engaging a button of the control device.

Illustration 17. A cleaning system for a swimming pool, the cleaning system comprising: an automatic swimming pool cleaner configured to operate in water within the swimming pool; and a control device comprising a housing, the housing comprising a communication region, wherein the control device is configured to operate and wirelessly communicate with the automatic swimming pool cleaner while at least the communication region of the housing is immersed in the water, and wherein the control device is a hand-held device.

Illustration 19. The cleaning system according to any preceding or subsequent illustrations or combination of illustrations, wherein the housing comprises a head portion and a non-head portion, and wherein the communication region of the housing is the head portion of the housing.

Illustration 20. The cleaning system according to any preceding or subsequent illustrations or combination of illustrations, further comprising a communication module within the housing, wherein the communication module comprises a transceiver.

Illustration 21. The cleaning system according to any preceding or subsequent illustrations or combination of illustrations, wherein the transceiver comprises a light transceiver, and wherein the control device is configured to wirelessly communicate with light-based signals.

Illustration 22. The cleaning system according to any preceding or subsequent illustrations or combination of illustrations, further comprising a power supply within the housing.

Illustration 23. The cleaning system according to any preceding or subsequent illustrations or combination of illustrations, further comprising a button engageable by a user for generating a wireless signal.

Illustration 24. The cleaning system according to any preceding or subsequent illustrations or combination of illustrations, further comprising a controller and a sensor, wherein the sensor is configured to detect a presence of water, and wherein the controller is configured to generate a wireless signal responsive to the detection of water by the sensor.

Illustration 25. The cleaning system according to any preceding or subsequent illustrations or combination of illustrations, wherein the automatic swimming pool cleaner further comprising a motor, a pump, a debris filter, and at least one motive element.

Illustration 26. The cleaning system according to any preceding or subsequent illustrations or combination of illustrations, wherein the automatic swimming pool cleaner is configured to generate a control response responsive to the wireless communication, and wherein the control response comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration 28. An automatic swimming pool cleaner comprising: a housing, a communication module, and a controller, wherein the automatic swimming pool cleaner is configured to be at least partially submerged within water of a swimming pool or spa, wherein the communication module is configured to receive a light signal while the automatic swimming pool is at least partially submerged, and wherein the controller is configured to: receive an electrical signal from the communication module, the electrical signal comprising at least one characteristic of the light signal; determine a control response for the automatic swimming pool cleaner based on the at least one characteristic; and control the automatic swimming pool cleaner pursuant to the determined control response.

Illustration 29. The automatic swimming pool cleaner according to any preceding or subsequent illustrations or combination of illustrations, wherein the control response comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

Illustration 30. A method of controlling an automatic swimming pool cleaner within a pool, the method comprising: receiving a light signal using a communication module on the automatic swimming pool cleaner, the light signal comprising at least one characteristic; determining a control response using a controller on the automatic swimming pool cleaner based on the received light signal and the at least one characteristic; and controlling the automatic swimming pool cleaner pursuant to the determined control response.

Illustration 31. The method according to any preceding or subsequent illustrations or combination of illustrations, further comprising generating the light signal remotely from the automatic swimming pool cleaner using a hand-held control device comprising a communication region, wherein generating the light signal comprises immersing at least the communication region of the hand-held control device in water of the pool, and wherein the light signal furnishes an operating instruction to the automatic swimming pool cleaner.

Illustration 32. The method according to any preceding or subsequent illustrations or combination of illustrations, further comprising generating the light signal remotely from the automatic swimming pool cleaner, wherein the automatic swimming pool cleaner is outside a body of water, and wherein the light signal furnishes an operating instruction to the automatic swimming pool cleaner through air.

Illustration 33. The method according to any preceding or subsequent illustrations or combination of illustrations, wherein the at least one characteristic comprises at least one of a pattern of the light signal, a color of the light signal, or a brightness of the light signal.

Illustration 34. The method according to any preceding or subsequent illustrations or combination of illustrations, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A control device for a pool system, the control device comprising:
   a housing; and
   a communication region on the housing, wherein the control device is configured to wirelessly communicate using the communication region with at least one piece of pool equipment of the pool system configured to perform a cleaning operation within a swimming pool or spa and submergible within water of the swimming pool or spa, and wherein the control device is a hand-held device and movable relative to the at least one piece of pool equipment, and wherein the control device is configured to wirelessly communicate using light-based signals with a communication region of the at least one piece of pool equipment submergible with the at least one piece of pool equipment and while the at least one piece of equipment is operating in water of the pool system.

2. The control device of claim 1, wherein the housing comprises a head portion and a non-head portion, and wherein the communication region of the housing is the head portion of the housing.

3. The control device of claim 1, further comprising a communication module for receiving and/or transmitting the light-based signals.

4. The control device of claim 3, further comprising a power supply within the housing.

5. The control device of claim 3, further comprising a button engageable by a user for generating the light-based signal.

6. The control device of claim 3, further comprising a controller and a sensor, wherein the sensor is configured to detect a presence of water, and wherein the controller is configured to automatically initiate wireless communication responsive to the detection of water by the sensor.

7. The control device of claim 1, wherein the control device is configured to wirelessly communicate using the communication region with at least one piece of equipment of the pool system through at least one of water or air.

8. The control device of claim 1, wherein the housing is elongated and comprises a first end and a second end, wherein a head portion of the housing comprises the first end and a non-head portion of the housing configured to be grasped by a user comprises the second end, wherein the communication region comprises a communication module at the first end and within the housing, wherein a controller is within the non-head portion of the housing, and wherein the control device comprises a first engagement feature for receiving input from the user generating a first type of light-based signal and a second engagement feature for receiving input from the user and generating a second type of light-based signal different from the first type of light based signal.

9. The control device of claim 1, wherein the control device is configured to send the light-based signal to the equipment at least while the communication region is submerged in water of a pool or spa.

10. A method of communicating with a cordless automatic swimming pool cleaner operating in water of a pool, the method comprising:
controlling a positioning of a hand-held control device at a spaced apart location relative to the cordless automatic swimming pool cleaner and such that the control device is not physically connected to the cordless automatic swimming pool cleaner; and
causing the control device to emit a light-based wireless signal through the water and to a communication region of the cordless automatic swimming pool cleaner which is submergible with the cordless automatic swimming pool cleaner.

11. The method of claim 10, further comprising causing the control device to receive a return signal from the cordless automatic swimming pool cleaner through the water.

12. The method of claim 10, wherein causing the control device to emit the wireless signal comprises engaging a button of the control device.

13. The method of claim 10, wherein positioning the control device comprises immersing at least a communication region of a control device in the water.

14. The method of claim 10, wherein the control device is a hand-held device, and wherein positioning the control device comprises holding the hand-held device.

15. A cleaning system for a swimming pool, the cleaning system comprising:
a cordless automatic swimming pool cleaner configured to perform one or more cleaning operations in water within the swimming pool, the cordless automatic swimming pool cleaner comprising a communication region submergible with the cordless automatic swimming pool cleaner in the water of the swimming pool; and
a control device comprising a housing, the housing comprising a communication region, wherein the control device is configured to operate and wirelessly communicate with the communication region of the cordless automatic swimming pool cleaner through at least one of air or water using light-based signals, and wherein the control device is a hand-held device and is movable independently from and relative to the cordless automatic swimming pool cleaner.

16. The cleaning system of claim 15, wherein the housing comprises a head portion and a non-head portion, and wherein the communication region of the housing is the head portion of the housing.

17. The cleaning system of claim 15, further comprising a communication module within the housing, wherein the communication module comprises a transceiver.

18. The cleaning system of claim 17, wherein the transceiver comprises a light transceiver.

19. The cleaning system of claim 17, further comprising a power supply within the housing.

20. The cleaning system of claim 17, further comprising a button engageable by a user for generating a wireless signal.

21. The cleaning system of claim 17, further comprising a controller and a sensor, wherein the sensor is configured to detect a presence of water, and wherein the controller is configured to generate a wireless signal responsive to the detection of water by the sensor.

22. The cleaning system of claim 15, wherein the cordless automatic swimming pool cleaner further comprising a motor, a pump, a debris filter, and at least one motive element.

23. The cleaning system of claim 15, wherein the cordless automatic swimming pool cleaner is configured to generate a control response responsive to the wireless communication, and wherein the control response comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

24. An automatic swimming pool cleaner comprising:
a housing, a communication module, a controller, and one or more motive elements, wherein the communication module, the controller, and the one or more motive elements are submergible with the automatic swimming pool cleaner in water of a swimming pool or spa;
wherein the automatic swimming pool cleaner is movable within the swimming pool or spa using the one or more motive elements, wherein the communication module is configured to receive a light signal while the automatic swimming pool cleaner is at least partially submerged, and
wherein the controller is configured to:
receive an electrical signal from the communication module, the electrical signal comprising at least one characteristic of the light signal;
determine a control response for the automatic swimming pool cleaner based on the at least one characteristic; and
control the automatic swimming pool cleaner pursuant to the determined control response.

25. The automatic swimming pool cleaner of claim 24, wherein the control response comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

26. A method of controlling an automatic swimming pool cleaner, the method comprising:
receiving a light signal using a communication module of the automatic swimming pool cleaner, the light signal comprising at least one characteristic, the communication module submergible with the automatic pool cleaner in water of a swimming pool or spa;
determining a control response based on the received light signal and the at least one characteristic using a controller of the automatic swimming pool cleaner which is submergible with the automatic swimming pool cleaner in the water of the swimming pool or spa; and
controlling the automatic swimming pool cleaner pursuant to the determined control response.

27. The method of claim 26, further comprising generating the light signal remotely from the automatic swimming pool cleaner using a hand-held control device comprising a communication region, wherein generating the light signal comprises immersing at least the communication region of the hand-held control device in water of the pool, and wherein the light signal furnishes an operating instruction to the automatic swimming pool cleaner.

28. The method of claim 26, further comprising generating the light signal remotely from the automatic swimming pool cleaner, wherein the light signal furnishes an operating instruction to the automatic swimming pool cleaner through at least one of air or water.

29. The method of claim 26, wherein the at least one characteristic comprises at least one of a pattern of the light signal, a color of the light signal, or a brightness of the light signal.

30. The method of claim 26, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

31. A method of controlling an automatic swimming pool cleaner, the method comprising:
receiving a light signal using a communication module of the automatic swimming pool cleaner, the light signal comprising at least one characteristic, wherein the communication module is submergible with the automatic swimming pool cleaner in water of a swimming pool or spa;
determining a control response using a controller o of the automatic swimming pool cleaner based on the received light signal and the at least one characteristic, wherein the controller is submergible with the automatic swimming pool cleaner; and
transmitting a return light signal using a light transceiver of the communication module of the automatic swimming pool cleaner and based on the received light signal.

32. The method of claim 31, further comprising controlling the automatic swimming pool cleaner pursuant to the determined control response.

33. The method of claim 32, wherein controlling the automatic swimming pool cleaner comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

34. The method of claim 31, further comprising generating the light signal remotely from the automatic swimming pool cleaner using a control device comprising a communication region, wherein the light signal furnishes an operating instruction to the automatic swimming pool cleaner.

35. The method of claim 31, wherein the at least one characteristic comprises at least one of a pattern of the light signal, a color of the light signal, or a brightness of the light signal.

36. A cleaning system comprising an automatic swimming pool cleaner, the automatic swimming pool cleaner comprising:
a housing, a communication module, and a controller, wherein the communication module and the controller are submergible with the automatic swimming pool cleaner in water of a swimming pool or spa,
wherein the automatic swimming pool cleaner is movable within the swimming pool or spa,
wherein the communication module is configured to receive a light signal while the automatic swimming pool cleaner is at least partially submerged, and
wherein the controller is configured to:
receive an electrical signal from the communication module, the electrical signal comprising at least one characteristic of the light signal;
determine a control response for the automatic swimming pool cleaner based on the at least one characteristic; and
generate and transmit a return light signal from the communication module based on the received light signal.

37. The cleaning system of claim 36, wherein the controller is further configured to control the automatic swimming pool cleaner pursuant to the determined control response.

38. The cleaning system of claim 37, wherein the control response comprises at least one of making linear movements with the automatic swimming pool cleaner, making rotational movements of the swimming pool cleaner, surfacing the automatic swimming pool cleaner, deactivating components of the automatic swimming pool cleaner, or energizing components of the automatic swimming pool cleaner.

39. The cleaning system of claim 36, further comprising:
a control device comprising a housing, the housing comprising a communication region, wherein the control device is configured to operate and wirelessly communicate with the automatic swimming pool cleaner through at least one of air or water using light-based signals.

40. The cleaning system of claim 39, wherein the control device is a hand-held device.

* * * * *